United States Patent
Gaonkar et al.

(12) 
(10) Patent No.: US 7,094,434 B2
(45) Date of Patent: Aug. 22, 2006

(54) COMPOSITE PARTICLES FOR BEVERAGE MIXES IMPARTING OPTICAL EFFECT IN BEVERAGES AND METHODS OF MAKING SAME

(75) Inventors: Anilkumar Ganapati Gaonkar, Buffalo Grove, IL (US); Cathy Jean Ludwig, Grayslake, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 249 days.

(21) Appl. No.: 10/702,804

(22) Filed: Nov. 6, 2003

(65) Prior Publication Data

US 2005/0100649 A1    May 12, 2005

(51) Int. Cl.
*A23L 1/05* (2006.01)
*A23L 1/03* (2006.01)

(52) U.S. Cl. .................. 426/74; 426/103; 426/471; 426/477; 426/573; 426/591

(58) Field of Classification Search .................. 426/74, 426/591, 573, 471, 477
See application file for complete search history.

(56) References Cited

U.S. PATENT DOCUMENTS

| | | |
|---|---|---|
| 2,868,646 A | 1/1959 | Schapiro |
| 2,984,543 A | 5/1961 | Smith et al. |
| 3,359,119 A | 12/1967 | Milton |
| 3,939,289 A | 2/1976 | Hornyak et al. |
| 3,965,273 A | 6/1976 | Stahl |
| 4,187,326 A | 2/1980 | Serafino et al. |
| 4,278,695 A | 7/1981 | Velasco |
| 4,343,819 A | 8/1982 | Wood et al. |
| 4,612,204 A | 9/1986 | Huffman |
| 4,678,661 A | 7/1987 | Gergely et al. |
| 4,760,138 A | 7/1988 | So et al. |
| 5,096,714 A * | 3/1992 | Kuhrts ................ 424/439 |
| 5,562,939 A | 10/1996 | Lewis |
| 6,106,883 A | 8/2000 | Sokolik et al. |
| 6,319,535 B1 | 11/2001 | Shaw |
| 6,365,209 B1 | 4/2002 | Cherukuri |

FOREIGN PATENT DOCUMENTS

GB    1379582 A    1/1975

* cited by examiner

*Primary Examiner*—Helen Pratt
(74) *Attorney, Agent, or Firm*—Fitch, Even, Tabin & Flannery

(57) ABSTRACT

Composite particle comprised of composite particles in which edible core particles are encapsulated with a coating comprising a material that forms a propellant gas when contacted with an edible acid in a solution such that the composite particles independently move in the solution sufficient to create a visual effect. The movement of the composite particles creates an interesting and enjoyable optical effect. In one embodiment, these composite particles are included in powdered beverage mixes including an edible acid which are reconstituted into drinking beverages having the optical effect imparted by the movement of the composite particles in solution.

37 Claims, No Drawings

COMPOSITE PARTICLES FOR BEVERAGE MIXES IMPARTING OPTICAL EFFECT IN BEVERAGES AND METHODS OF MAKING SAME

FIELD OF THE INVENTION

The present invention generally relates to particulate materials that impart optical effects in beverages.

BACKGROUND OF THE INVENTION

Powdered beverage mixes, such as KOOL-AID® and TANG®, have been commercially available for many years. They are relatively long shelf life, stable products that are reconstituted from the dry mixes when desired without the need to handle and transport the bulk fluid carrier. Powdered beverage products generally are an alternative product choice for consumers with so-called ready-to-drink (RTD) beverage products. RTD beverages offer a consumer a different form of convenience because the consumer does not need to formulate the drink from powder and water before consuming it. Beyond these differences, the conventional reconstituted powdered beverages and RTD beverages are often very similar to consumers. The food and beverage industry would be interested in novelties that can be introduced in powdered beverage mixes to help differentiate these product lines and spark consumer interest in powdered beverage mixes.

U.S. Pat. No. 6,319,535 describes an edible confection with a recognizable shape that repeatedly rises and sinks in a transparent carbonated beverage due to its changing buoyancy resulting from physical attachment of carbonation bubbles derived from the beverage onto the surface of the confection until it becomes buoyant enough to cause it to rise to the surface of the beverage where the attached bubbles escape to the atmosphere causing the confection to become less buoyant such that it descends back towards the bottom of the drink; the attachment of carbonation bubbles begins again, and the confection's motion cycle repeats itself. U.S. Pat. No. 6,319,535 describes a preference for low solubility gelatin-based confections that do not muddy the beverage and provide a suitable surface for nucleation of carbonation bubbles. According to U.S. Pat. No. 6,319,535, it also has been known that raisins or small clay balls undergo the phenomenon of ascending and descending in carbonated fluids by the attachment and surface-release of carbonation bubbles. U.S. Pat. No. 6,319,535 also describes toy submarines having an interior chamber holding a charge of baking powder, whereby the toy ascends and descends in water. The motion in this case is a result of bubbles from the carbonated beverage collecting and releasing from particles of a specific density and surface area.

U.S. Pat. No. 4,760,138 describes dry carbonating agents comprised of a carbohydrate/metal bicarbonate complex prepared by reacting a carbohydrate in aqueous solution with metal hydroxide or oxide at a temperature not exceeding 25° C. to form a carbohydrate/metal hydroxide adduct to which carbon dioxide is then introduced to form the complex, which is dried for use in beverage powders. Upon rehydration, the complex releases carbon dioxide and carbonates the beverage. The carbohydrates are described as mono-,di-, and polysaccharides and polyols.

U.S. Pat. Nos. 6,106,883 and 5,562,939 describe inclusions suspended within a liquid, in which the inclusions are pieces of a jelly-like substance described as fruit pulp cells, fruit pulp particles, fruit pieces, gold particles, droplets of flavoring, or clouding agents. A pre-gel solution containing gellan gum is incorporated into a liquid composition with the inclusions. The resulting suspending solution is then agitated to suspend the inclusions such that they do not float or sink.

U.S. Pat. No. 4,187,326 describes a fruit flavored dry beverage mix which comprises sugar, food acid, flavor, color, and a clouding agent obtained by co-drying an aqueous dispersion comprising a major amount of solubilized maltodextrin and a minor amount of xantham gum and titanium dioxide.

U.S. Pat. No. 6,365,209 describes an encapsulated product in the form of a caplet containing an active ingredient that can be incorporated into a food item, soft confectionary product, hard confectionary product, jelly gum confectionary product, dry beverage, or chewing gum product.

There remains a need for improved approaches for introducing movable components in beverages that provide a more stimulating visual impact upon the consumer to increase the consumer's enjoyment of the beverage. The present invention fulfills these, as well as other needs and objectives, as will be apparent from the following description of embodiments of the present invention.

SUMMARY OF THE INVENTION

This invention provides new composite particles that impart unique and entertaining optical effects in beverages. The composite particles have edible, water-soluble core particles encapsulated with a coating comprising a material that forms a propellant gas when contacted with an edible acid in a solution. The release of the gas propels the composite particles, causing them to independently move about in the solution. The resulting movement of the self-propelled composite particles in the solution creates an interesting optical effect.

In one embodiment, these composite particles are included in combination with a dry, water-soluble edible acid in a powdered beverage mix that can be reconstituted into a drinking beverage. When reconstituted, the composite particles of the powdered beverage independently move or "swim" through the liquid giving an interactive, fun visual effect, especially to children. The optical effect imparted to beverages by the composite particles of embodiments of this invention increases the consumers' interest in and enjoyment of the beverage. In one aspect, the composite particles provide a generally up-and-down motion in a liquid beverage, although other directions of particle movement also are obtainable. In one embodiment, this composite particle movement results in a eye-pleasing "snow globe" effect. In one embodiment, the composite particles move fast enough in the liquid to be eye-catching. They move in the liquid under self-propulsion, upon reaction, at a highly noticeable speed, such as at an initial speed of about 5 cm/sec. In one embodiment, the self-propelled movement of the composite particles can persist for up to at least about 90 seconds, and more preferably for at least about 2.5 minutes, after admixture of the composite particles and edible acid in the beverage or other potable fluid. The movement of the composite particles is independent in nature, as no external force such as beverage carbonation is needed to induce movement of the composite particles within the fluid.

In one embodiment, a powdered beverage mix includes composite particles comprising a core particle upon which an encapsulating coating is formed that includes a carbon dioxide-forming substance. In one preferred embodiment, an edible acid is included in powdered form as an additional ingredient of a powdered beverage mix containing the composite particles. Alternatively, the edible acid could be separately introduced into a reconstituted beverage along with the composite particles. In either case, when the composite particles are introduced into a solution together with the edible acid, the acid reacts with the a carbon dioxide-forming substance residing in the particle coating. This reaction brings about a release of carbon dioxide gas from the particle coating as a reaction product that creates a kinetic force that effectively propels the composite particles within the solution. This particle movement will continue until the supply of the carbon dioxide-forming substance in the particle coating, or the edible acid in the solution, becomes depleted. Alternatively, the acid could be included within, or could form, the core of the particles. In that case, the core should be coated with a matrix material before being coated with the gas-producing coating. The gas-producing materials in the coating would only react with the acid in the core once the matrix material has dissolved.

The composite particles have a size permitting a consumer to visually observe, without the need for optical magnification, the resulting independent movement of composite particles through the fluid, creating an interesting and entertaining visual effect. Generally the composite particles are spherical in nature; of course, other shaped particles can be used if desired. Thus, for example, the composite particles could be spherical, flakes, football shaped, star shaped, heart shaped, crescent moon shaped, flakes, and the like. The beverage need not be a carbonated fluid to obtain the optical effect of the self-propelled composite particles because the carbon dioxide or other gas propellant is generated in situ in a controlled manner by the reaction of the edible acid in the fluid with the carbon dioxide or other gas producing source provided in the coating encapsulating the cores of the composite particles.

In one embodiment, the composite particles comprise cores that are edible, water-soluble particles of a carbohydrate material. In another embodiment, the composite particles comprise cores that are edible, water-soluble particles of a salt or an acid. For purposes of this invention, the term water-soluble in reference to the particle core is intended to include both water-soluble and water dispersible. The core particle material used is water-soluble or water dispersible to extent that it does not create a gritty mouthfeel in the beverage or significantly effect the clarity of the beverage. The encapsulating coating formed or deposited on the cores comprises a solid or semi-solid carbon dioxide-forming substance that is temporarily retained in place in the coating by an edible slow-dissolving matrix material until the carbon dioxide-forming substance is contacted by and reacted with an edible acid that is dissolved or dispersed in the liquid beverage. The carbon dioxide-forming substance provided in the particle coating is any edible material from which carbon dioxide gas is formed and released when acted upon by an edible acid in an aqueous environment under ambient conditions.

The coating is formed or deposited on the exterior surfaces of the core particles of the composite particles in a manner in which it encapsulates the surface of the core particles. "Encapsulation" or equivalent language means the coating formed on the core particle covers at least a majority, and preferably essentially all, of the outer surface of a particle. The extent of encapsulation by the coating must be sufficient such that the core particles are not overly exposed immediately to the solution such that the composite particles rapidly disintegrate due to premature dissolution of the cores before the coatings have time to react with acid and generate carbonation to propel the composite particles through the liquid.

In one embodiment, the gas-forming substance provided in the coating formed on the core particles of the composite particles comprises an edible bicarbonate compound, such as an alkaline metal bicarbonate like sodium bicarbonate, potassium bicarbonate, baking powder, and combinations thereof. The bicarbonate generates and releases carbon dioxide gas when reacted with an edible acid, the resulting force of which propels the composite particles in a beverage.

In one embodiment, the edible matrix material used to retain the gas-forming substance in the coating until it is contacted and reacted with edible acid is a food polymer, such as gum arabic, gelatin, maltodextrin, and the like or mixtures thereof. In one embodiment, the matrix material has a water-solubility such that it does not dissolve in an aqueous environment at a faster rate than the rate of reaction of a carbon dioxide-forming substance with edible acid dispersed in the same aqueous environment. In that manner, the carbon dioxide-forming substance is held in place by the matrix material in the coating until it is contacted with edible acid. This minimizes unreactive bicarbonate from being freed from the coatings into the surrounding aqueous environment due to premature disintegration of the coating's matrix material before the bicarbonate has an opportunity to react with acid.

In one embodiment, the interesting visual effect imparted by the composite particles can be used to increase young consumers' interest in drinking a beverage fortified with vitamins, minerals, and/or other nutritional sources and supplements. In another embodiment, a method of making the composite particles is provided.

DETAILED DESCRIPTION OF THE INVENTION

The present invention generally relates to the manufacture and use of edible self-propelling composite particles which, when placed in a beverage, will independently move within the beverage, creating an interesting and entertaining visual effect. The composite particles can be added as a discrete individual component to potable liquids, or as one of a plurality of components in combination as a powdered beverage mix that can be reconstituted with a fluid to prepare a drinkable beverage.

Beverages formulated with composite particles described herein are formulated as transparent beverages. For purposes herein, a "transparent" liquid means the liquid is sufficiently clear such that the movement of the composite particles can be visually observed without optical magnification. The viewing distance from which their movement can be observed generally includes within about 50 cm, including in the range of about 10 cm to about 200 cm, but is not necessarily limited thereto. The composite particles of embodiments of the present invention do not cloud the beverage to any extent to significantly obscure their movement. Moreover, beverage mixes according to embodiments described herein are comprised of the composite particles in combination with other dry ingredients which permit a transparent beverage to be reconstituted from them.

The composite particles should provide the following characteristics: (a) a water-soluble particle core and (b) a coating applied to the water-soluble particle core, wherein the coating contains a material which can form carbon dioxide upon contact with an edible acid dispersed in a beverage and wherein the coating dissolves slowly, not instantaneously, in water so that the optical effect can be seen for longer time. The composite particles, thus, include two primary structural components: an edible core and a coating that encapsulates the coating which can release, form, or otherwise be used to generate gas that propels the composite particles through a solution when the coating is contacted with an edible acid present in the solution. The coating likewise comprises constituents that are edible, or which react in solution with other co-ingredients of the beverage to form edible substances.

In some instances, it may be desirable to delay the onset and/or extend the length of the optical effect. The optical effect (i.e., when it begins and how long it lasts) can be controlled by manipulating the composition and thickness of the coating. For example, the optical effect could be delayed by applying a non-gas producing coating (e.g., using the same material as used to produce the core) on the gas-producing coating. Only once the non-gas producing coating is dissolved, can gas be generated. The thickness of the non-gas producing coating can be manipulated to control the length of the delay. Likewise, the duration of the optical effect can be manipulated by controlling the thickness of the gas-producing coating.

In general, the cores are solid particles that will dissolve in an aqueous solution when directly contacted with the fluid. In general, the coating is a solid or semi-solid material that can be temporarily attached to the outer surface of the cores. Moreover, the coating contains a component that forms, releases, or otherwise generates a propellant gas in situ when the coating is contacted with an edible acid in an aqueous solution. The release of a gaseous reaction product as a result of those contacting materials causes the composite particles to independently move about in the solution and create the interesting optical effect.

In one embodiment, the gas-forming substance provided in the particle coating is a carbon dioxide-forming substance. The carbon dioxide-forming substance may be edible bicarbonate compound, such as an alkaline metal bicarbonate like sodium bicarbonate ($NaHCO_3$) or potassium bicarbonate ($KHCO_3$). It also may be or include baking powder. Various combinations of these bicarbonate-containing materials also can be used. Baking powders, for purposes herein, means baking soda (i.e., sodium bicarbonate) admixed with a powdered acidic substance, such as cream of tartar ($KHC_4H_4O_6$), calcium dihydrogen phosphate ($Ca(H_2PO_4)_2$, or sodium aluminum sulfate ($NaAl(SO_4)_2.H_2O$), and the like, for which no reaction takes place while the powder is dry, but forms carbon dioxide in water via in situ generation of acid (i.e., hydronium ions) that react with the bicarbonate.

In a preferred embodiment, the gas-producing substance is encapsulated in a slow-dissolving matrix material in the coating. Upon and during gradual dissolution or melting of the matrix material, gas is released which propels and moves the composite particles in the liquid. In one embodiment, the edible matrix material that retains the gas-forming substance in the coating until it is contacted and reacted with edible acid is a food polymer that slowly dissolves in water. The food polymer may be selected from gum arabic, gelatin, maltodextrin, xanthan gum, locust bean gum, guar, pectin, carrageenan, cellulose, and combinations thereof. Suitable cellulose materials include, for example, sodium carboxymethylcellulose, methylcellulose, hydroxypropyl cellulose, hydroxypropylcellulose, and the like, as well as mixtures thereof. In one preferred embodiment, the food polymer is gum arabic, gelatin, a low DE maltodextrin, or combinations thereof.

Generally, the food polymer has a water-solubility such that it does not dissolve in an aqueous environment at a faster rate than the rate of reaction of the gas-forming substance with edible acid dispersed or dissolved in the same aqueous environment. In that manner, the carbon dioxide-forming substance is held in place by the food polymer in the same coating until it is contacted with edible acid. Consequently, substantial non-reacted bicarbonate portions of the particle coatings are not freed from the cores into the surrounding aqueous environment due to premature disintegration of the coating's matrix material before the bicarbonate is reacted with acid in situ on the composite particles. In general, this permits the composite particles to be eroded from the outside surface inward until the core is exposed, at which point it starts to dissolve at the exposed location(s).

Although sugar is the preferred water-soluble core material for the particles, other edible and water-soluble materials available in particulate form can be used. In one preferred embodiment, the core particles may be commercially available confectionary sugar, such as large grain AA size sugar. More generally, the water-soluble core particles are particles comprised of a saccharide, such as a monosaccharide, a disaccharide, or a polysaccharide, and combinations thereof. The disaccharide may be selected from, for example, sucrose, maltose, cellobiose, lactose, and combinations thereof. The monosaccharide may be selected from, for example, fructose, glucose, dextrose, mannose, galactose, ribose, xylose, arabinose, gulose, lyxose, and combinations thereof. The polysaccharide may be selected from, for example, starch, dextrin, cellulose, polydextrose, raffinose, and combinations thereof.

As noted above, the core may also comprise edible salts or edible acid. Examples of edible salts include sodium chloride, potassium chloride, sodium phosphate, and sodium or potassium salts of organic acids (e.g., sodium or potassium citrate, sodium or potassium fumarate, tassium tartarate, and the like). Examples of edible acids, which should be dry, crystalline or granular in nature include citric acid, fumaric acid, tartaric acid, and the like. Of course, in the case of edible acid cores, the core should be protected by a non-reactive, water soluble layer in order to prevent premature reaction with the gas-producing layer.

The coating is formed or deposited on the exterior surfaces of the core particles of the composite particles in a manner in which it encapsulates the surface of the core particles. "Encapsulation" or equivalent language means the coating formed on the core particle covers at least a majority, and preferably essentially all, of the outer surface of a particle. The extent of encapsulation by the coating must be sufficient such that the core particles are not overly exposed immediately to the solution such that the composite particles rapidly disintegrate due to premature dissolution of the cores before the coatings have time to react with acid and generate carbonation to propel the composite particles through the liquid.

In one embodiment, the core particles are coated with the coating containing the gas-forming substance and matrix material by suspending the core particles in a fluid bed and spraying them with the coating composition containing a dispersion of the gas-forming substance and matrix material, followed by drying and recovering the coated particles. In these fluid bed coating systems, a top spray system can be used to apply the coating on the core particles. Alternatively, a bottom spray system, such as a Wurster spray system, alternatively can be used to apply the coating. Also, a tangential (rotor) spray system could be used to apply the coating to the core particles. Suitable multi-purpose fluid bed processors also are generally known for particle coating applications that enable different types of spray nozzle inserts to be readily installed in a common spray system, so that the same processor can be operated to apply a coating variously as a top spray, Wurster spray, or tangential spray. A coating system comprising a rotary drum coater also could be used. These coating processes can be run continuously or batch style. Suitable equipment for applying coatings on particles with these types of spray systems are commercially available. For example, suitable top-spray and bottom-spray fluid bed coaters available from Glatt Air Techniques Inc. can be used or readily adapted for use in applying the coating of the composite particles of embodiments of the present invention.

In preparing the coating composition that is applied and then dried upon the core particles, the proportions of the gas-forming substance and matrix material are not particularly limited as long as sufficient amounts of each respective component are present in the dried coating to sustain their respective intended purpose. Namely, sufficient gas-forming substance should be included such that the self-propelling effect is achieved with respect to the composite particles upon introduction into a potable liquid. Sufficient matrix material should be included to retain the gas-forming substance in place on the core particles until the gas-forming substance is contacted and reacted with edible acid in the potable liquid. In one embodiment, the coating composition is prepared as a sprayable aqueous solution containing, on a dry weight percentage basis, about 1 to about 50 percent gas-forming substance, and about 5 to about 60 percent matrix material.

In addition, other materials (fillers) such as starch, maltodextrins, other carbohydrates, gums, and emulsifiers may be used in the coating composition. Color(s) can be added in the coating to provide an extra visual effect. Different colored particles moving up and down can provide an enhanced pleasing visual effect. In addition, flavors may be added to the coating. The coating also can be formulated to produce a distinctive sound, such as a fizzing, crackling, or similar sound, along with the up and down movement of the particles.

Compositional ranges for the composite particles according to one non-limiting embodiment of the invention include, on a dry weight basis, about 10 to about 90 percent sugar or other water-soluble or water-dispersible core particles, about 1 to about 60 percent gum arabic, gelatin, or other slow dissolving food polymers, about 1 to about 50 percent sodium bicarbonate, and 0 to about 50 percent additives such as colorants, flavorants, starch, maltodextrins, other carbohydrates, and/or the like.

The order of addition of the coating composition components is not necessarily limited. In one embodiment, the matrix material first is dispersed or dissolved in water with high speed mixing, followed by addition of the gas-forming substance with mixing. Some gas-forming substances such as bicarbonates may have a tendency to settle as solid sediments in the mixture; thus, in such cases, it is desirable to continue stirring or agitation of the mixture after introduction of the gas-forming substance until the coating composition is coated on the core particles. In one preferred embodiment, the pH of the solution is increased by adding a base before addition of the gas-forming substance to minimize foaming that otherwise can occur upon addition of gas-forming substances such as bicarbonates to the intermediate solution of the matrix material containing acidic groups. Foaming is undesirable due to lost material if the container overflows, process delays to allow the foam to subside, and difficulties associated with pumping foamy materials. The amount of pH increase needed to control foaming can be determined on a case-by-case basis for any given coating composition. In general, the greater the pH increase imparted, the less likely the mixture will foam upon introduction of the gas-forming substance. However, it also is generally desirable to avoid highly alkaline powders for purposes of beverage mix ingredients, so it is preferable not to impart greater increases in pH than needed to control foaming. The material used to adjust the pH can be, for example, an alkali metal hydroxide.

In one embodiment, the coating containing the gas-forming substance is not overcoated itself, but rather has an exposed outer surface that directly contacts a liquid medium into which it is introduced. However, to the extent the coating containing the gas-forming substance is overcoated, the overcoating should be a very thin material that dissolves away extremely rapidly (e.g., less than about 5 seconds) in an aqueous solution so that the onset of the desired optical effect desired is not unduly delayed. Of course, if a delay in the onset of the desired optical effect is desired, the overcoating can be thicker.

The composite particles have a size permitting a consumer to visually observe the resulting independent movement of them through the fluid, creating an interesting and entertaining visual effect. In one embodiment, the composite particles have visually discernible size that is less than about 4 mm. In general, the composite particles have a size ranging between about 0.3 to about 3.5 mm, although they are not limited thereto; more preferably they are about 1 to about 1.5 mm. Composite particle sizes are generally limited on the high side by practical considerations of maintaining a size that can be suspended in a liquid without settling problems, and which will dissolve after the visual effects are enjoyed for a reasonable amount of time but not so long that the beverage can not be consumed without consumer receiving a gritty mouthfeel from residual undissolved composite particles. The coating thickness applied on the core particles should also take these considerations into account. Generally, the thickness of the coating is about 50 to about 500 microns.

The edible acid that reacts with the gas-forming substance to form carbon dioxide as a reaction product thereof are used in the present invention. Non-limiting examples of the edible acid include, for example, citric acid, malic acid, fumaric acid, phosphoric acid, and combinations thereof. In one preferred embodiment, the edible acid is a material that can be formed into stable dry powdered form that will dissolve or disperse in water.

In a further embodiment, a powdered beverage mix includes composite particles described herein. The powdered beverage mix typically contains at least one flavoring agent and/or taste-enhancing ingredient. In one embodiment thereof, an edible acid is also included in powdered or particulate form as an additional ingredient of the powdered beverage mix containing the composite particles. Alternatively, the edible acid could be separately presented or introduced into a reconstituted beverage into which the composite particles are introduced via a dry beverage mix. In either case, when the composite particles are introduced into a solution together with the edible acid, the acid reacts with the gas-forming substance residing in the particle coating. In the instance of bicarbonate included in the gas-forming substance, this reaction brings about a release of carbon dioxide gas from the particle coating as a reaction product that creates a self-propelling force that moves the composite particles through the solution. This particle movement will continue until the supply of carbon dioxide-forming substance in the particle coating, or the edible acid in the solution, becomes depleted.

When reconstituted, the composite particles of the powdered beverage independently move or "swim" through the liquid giving an interactive, fun visual effect, especially to children. In one aspect, the self-propelled composite particles have a generally up-and-down motion in a liquid beverage, although it is not necessarily limited thereto. In one embodiment, the composite particles move in the liquid at an average speed of about 5 cm/sec for at least about 90 seconds, and more preferably for at least about 2.5 minutes, after admixture of the composite particles and edible acid in the beverage or other potable fluid. In one embodiment, this composite particle movement results in a eye-pleasing snow globe effect. The movement of the composite particles is independent as no external force is needed to induce movement of the composite particles within the fluid. In one embodiment, the interesting visual effect imparted by the composite particles can be used to increase young consumers' interest in drinking a beverage including vitamins, minerals, and/or other nutritional sources and supplements.

The powdered beverage mixes optionally can include other ingredients in addition to the composite particles (and edible acid, if included in the beverage mix). The only basic limitations on the optional ingredients is that they must be edible and not induce clouding in a beverage that might obscure movement of the composite particles. Of course, such optional ingredients should not impart an undesirable off-taste, off-color, off-odor, unpleasant mouthfeel, unpleasant smell, or gritty texture to the beverage.

The liquid in which the composite particles and edible acid, and any other ingredients, is dissolved can be aqueous-based, alcohol-based, or any other suitable liquid solvent for the ingredients. Water-based liquid vehicles are preferred in the practice of the invention, but not limiting. The proportion of liquid generally will be that sufficient to permit solubilization of the ingredients and also sufficient to permit the desired strength/dilution of the flavoring agents to be achieved. Generally, the proportion of water used in reconstituted beverages encompassed by the invention will be about 70 to about 99 percent.

When a beverage according to this invention is a fruit-flavored beverage, water-soluble, water-dispersible, or oil-soluble fruit flavoring agents can be used. A fruit flavoring agent may be used, for example, which imparts a orange, grapefruit, peach, lime, lemon, grape, pineapple, kiwi, raspberry, cherry, or other fruit flavor.

Food colorings also can be added to the inventive beverages, such as U.S. Certified Food Colors. Preservatives also can be added to the inventive beverage mixes, such as sodium benzoate, ascorbic acid or propylene glycol. Also, consumers often can be expected to use tap water to reconstitute the beverage from the dry powdered beverage mixes. In that tap water often is slightly alkaline due to the presence of dissolved mineral salts therein, edible acidulants, such as citric acid, phosphoric acid or malic acid, and so forth, also can be included to neutralize the alkalinity of tap water, or for other purposes. Of course, the total composition of the dry beverage mix, including the composite particles, should be adjusted to provide the desired properties of the ultimate beverage. Thus, for example, if the particle core is a sugar, the amount of sugar added via the particles should be taken into account in formulation the remaining dry beverage composition to achieve the overall desired sweetness and/or other properties. The powdered beverage mixes of this invention can be reconstituted in a non-carbonated liquid, a carbonated liquid, or they optionally can be carbonated after reconstitution.

The beverage mixes of this invention also can contain a sweetener. The sweetener can be selected, for example, from one or more of sucrose, glucose, fructose, hydrolyzed corn starch, maltodextrin, corn syrup solids, lactose, high fructose corn syrup, fructooligosaccharides, artificial sweeteners, and mixtures thereof. The artificial sweeteners can be, for example, aspartame, sucralose, saccharine, cyclamates and acesulfame potassium, and they can be added to reduce caloric content otherwise added by natural sweeteners. The sweetener generally will be present in granulated form in the mix prior to reconstituting the drink. The amount of sweetener can vary, but generally, if present, is in the range of from about 0.5 to about 25 percent of the reconstituted beverage or other type of beverage.

Fat also optionally can be introduced as an ingredient of the beverages, such as in the form of soy oil, hydrogenated soy oil, fractionated coconut oil, high oleic safflower oil, corn oil, canola oil, and the like, and mixtures thereof. For example, soy drinks can be prepared as beverages reconstituted from powdered dry mixes according to embodiments of the invention.

The powdered beverage mixes of the present invention are formed from a dried flavor base containing the composite particles. The flavor base can be dried by conventional means known to the art, such as spray drying, evaporative drying, vacuum drying, or freeze drying. Preferably, the drying method provides rapidly dissolvable particles. Sugar, and/or stabilizers such as cellulose and the like, also can be used as carriers for other ingredients of the dried flavor base.

Additional optional ingredients include one or more of other common ingredients for beverages, e.g., functional agents like flow agents such as silica, or caffeine, and so forth. For health drinks, a vitamin/mineral premix also could be included.

In another embodiment, the composite particles described herein may be directly added in powder form to a liquid containing an edible acid to impart the optical effect of the self-propelled particles. That is, in one embodiment, the composite particles may be added as a separate individual product to a ready-to-drink beverage (RTD) that already contains acid to impart the optical effect.

The beverage into which the composite particles are introduced need not be a carbonated fluid to obtain the optical effect of the self-propelled composite particles because the carbon dioxide or other gas propellant is generated in situ in a controlled manner by the reaction of the edible acid in the fluid with the carbon dioxide or other gas-forming source provided in the coating encapsulating the cores of the composite particles.

The Examples that follow are intended to illustrate, and not to limit, the invention. All percentages used herein are by weight, unless otherwise indicated.

EXAMPLE 1

Composite particles that can provide an interesting temporary optical effect in a liquid beverage were prepared in the following manner. A coating composition was prepared containing approximately 33 percent gum arabic, 49 percent water, and 18 percent sodium bicarbonate. Gum arabic was introduced into water with high speed mixing. The pH of intermediate gum arabic-containing solution was adjusted to about 7 by adding a small amount of 10 percent KOH solution in order to reduce foaming. Then, the sodium bicarbonate was added with mixing; only minimal foaming occurred. Until used in the sugar particle coating procedure, the gum/bicarbonate solution was stirred intermittently to prevent settling of sodium bicarbonate. In separate trials prepared similarly except without the intermediate pH adjustment, excessive foaming occurred in the mixture when the bicarbonate was added; although not preferred, such compositions could be used so long as the foam was allowed to subside before the coating procedure.

Sieved sugar particles (1200 g;–14 mesh U.S. sieve series (<1.41 mm)) were placed in a Glatt Air Techniques fluidized bed agglomerator equipped for top spray coating applications. The sugar particles were coated with the gum arabic/sodium bicarbonate coating solution (1800 g) using the following operating settings and conditions: nozzle setting of 0.5; spraying air pressure of 4 bar (57 p.s.i.); flow rate of the coating solution of 7 mL/min; the inlet air temperature at 60° C.; the exhaust air temperature of 40°; the outlet air flap at 30 percent open; and drying continued about 5 minutes at an exhaust air temperature of 40° C. once the spraying was completed. Composite particles were removed from the agglomerator and sieved to obtain different size fractions. The overall composition of the composite particles on a dry weight basis was the following: 56.5 percent sugar, 28.0 percent gum arabic, and 15.5 percent sodium bicarbonate. In one non-limiting preferred embodiment, composite particles pass through 14 mesh (U.S. Sieve) are suitable in beverages applications.

EXAMPLE 2

This example illustrates the use of composite particles in powdered acidic soft drinks. Composite particles prepared according to Example 1 were sieved to recover the −14 +30 fraction (U.S. Sieve Series sizes). About 0.5 g of the composite particles was mixed with two different powdered soft drinks (13 g; i.e., KOOL-AID® and TANG®. When 160 ml water was added to each of these mixtures, the composite particles first floated to the top, then sank to the bottom, then floated to the top, and so in a cyclic manner. The effect continued for approximately 2.5 minutes. The initial rate of movement of the composite particles was about 5 cm/sec in each case, which slowly decreased as the sodium bicarbonate was used up. Carbon dioxide produced by the reaction between the acid in the beverages and sodium bicarbonate in the coating changed the buoyancy of the sugar particles, thereby affecting the up and down motion. The duration of movement of the composite particles can be varied, for example, by adjusting the thickness of the coating and/or the concentration of sodium bicarbonate in the coating and/or the concentration of acid in the beverage.

Although exemplified in an acidic drink above, the composite particles also can be applied in non-acidic powder drinks. In the instance of non-acidic beverages, acids having less tartness/sourness can be added to the powdered soft drink to initiate the acid-base reaction between the gas-forming substance and the acid without causing tart or sour flavor. Under such circumstances it is preferred to add just enough acid to neutralize sodium bicarbonate in the sugar particles so that tartness/sourness is not perceived in the beverage, which is suppose to be non-acidic.

EXAMPLE 3

Composite particles that provide an interesting temporary optical effect in a liquid beverage were prepared and tested in a beverage in the following manner. Sieved confectionary sugar particles (1200 g; AA grade; −14 mesh (<1.41 mm)) were coated with 1800 g of a gum/bicarbonate solution containing approximately 32.4 percent gum arabic, 49.2 percent water, and 18.2 percent sodium bicarbonate. The gum/bicarbonate solution was obtained by mixing 711 g of gum arabic in 1080 g water. The pH of this initial gum solution, before adding KOH or bicarbonate, was 4.5. The pH of the gum solution was adjusted to 7.84 by addition of about 4 g 10 percent KOH to control foaming, followed by addition of 400 g sodium bicarbonate. The pH of the mixture after bicarbonate addition was completed was 7.84. The gum/bicarbonate solution (about 1800 g) was used in the sugar particle coating procedure. Until used in the sugar particle coating procedure, the gum/bicarbonate solution was stirred intermittently to prevent settling of sodium bicarbonate. The gum/bicarbonate solution was coated upon the sugar particles to form the composite particles using a similar spray drying system and method as described in Example 1.

Approximately 0.5 g of the resulting composite particles were dry blended with about 13 g of dry KOOL-AID® mix. About 13.5 g of the modified KOOL-AID® mix was mixed with about 160 mL tap water. The composite particles noticeably moved up and down in the reconstituted beverage.

Gum arabic helped to prolong the movement of the composite particles because it dissolves slowly. Thus the sodium bicarbonate in the particle coating is exposed to edible acid in a controlled manner such that it reacts slowly to produce carbon dioxide.

EXAMPLE 4

Composite particles including a dye-colored coating that provide an interesting temporary optical effect in a liquid beverage were prepared and tested in a beverage in the following manner. Sieved confectionary sugar particles (1200 g; AA grade; −14 +30 mesh) were coated with 1800 g of gum/bicarbonate solution containing approximately 32.5 percent gum arabic, 48.8 percent water, and 18.1 percent sodium bicarbonate. The gum/bicarbonate solution was obtained by mixing 720 g of gum arabic in 1080 g water. Then, 1 g FD&C Blue Dye No. 1 (other food grade dyes can be used) was added to the gum solution. The pH of the gum solution was adjusted to 8 by addition of 12.4 g 10 percent KOH to help reduce foaming, followed by addition of 400 g sodium bicarbonate. The pH of the mixture after bicarbonate addition was about 8. The gum/bicarbonate solution (1800 g) was used in the sugar particle coating procedure. Until used in the sugar particle coating procedure, the gum/bicarbonate solution was stirred intermittently to prevent settling of sodium bicarbonate. The gum/bicarbonate solution was coated upon the sugar particles to form the composite particles using a similar fluidized bed system as Example 1 using the following operating conditions: spraying air pressure of 4 bar (57 p.s.i.); flow rate of the coating solution at 18 mL/min; inlet air temperature at 50° C.; exhaust air temperature of 45° F.; outlet air flap at 75 percent open. Drying was continued for about 5 minutes after completion of the coating. Composite particles were removed from the agglomerator and sieved to obtain two size fractions of −8+14 and −14 +30 mesh.

Approximately 0.5 g of the composite particles of the −14 +30 fraction were dry blended with about 13 g of dry KOOL-AID® mix. About 13.5 g of the modified KOOL-AID® mix was mixed with about 160 mL tap water. The composite particles noticeably moved up and down in the reconstituted beverage for about 2.5 minutes. A similar beverage was prepared with the −8 +14 mesh fraction and similar results were obtained except that the movement continued for a longer time period (i.e., about 3 minutes).

EXAMPLE 5

A coating composition was prepared containing approximately 26 percent gum arabic, 57 percent water, and 17 percent sodium bicarbonate. Gum arabic was introduced into water with high speed mixing. The pH of the intermediate gum arabic-containing solution was adjusted to about 7 by adding a small amount of 10 percent KOH solution in order to reduce foaming upon the addition of the sodium bicarbonate. The sodium bicarbonate was added with mixing; only minimal foaming was observed. Until used in the sugar particle coating procedure, the gum/bicarbonate solution was stirred intermittently to prevent settling of sodium bicarbonate Sieved sugar particles (1500 g; −14 mesh U.S. sieve series (<1.41 mm)) were placed in a fluidized bed agglomerator equipped for bottom spray (Wurster) coating applications. The sugar particles were coated with 2800 g gum/bicarbonate solution using the following operating settings and conditions: air flow of 120 SCFM; flow rate of the coating solution of 20–100 g/min; the inlet air temperature at 55° C.; outlet air temperature of 38° C.; and drying continued about 5 minutes at an exhaust air temperature of 38° C. once the spraying was completed. Composite particles were removed from the agglomerator and sieved to obtain different size fractions. The overall composition of the composite particles on a dry weight basis was the following: 55.7 percent sugar, 26.8 percent gum arabic, and 17.5 percent sodium bicarbonate.

Composite particles passing through 14 mesh (U.S. Sieve) were used to prepare a dry beverage mixture. Approximately 0.5 g of the resulting composite particles were dry blended with about 13 g of dry KOOL-AID® mix. About 13.5 g of the modified KOOL-AID® mix was mixed with about 160 mL tap water. The composite particles started moving up and down in the reconstituted beverage in about 2.5 minutes and the effect was complete five minutes after the addition of water.

EXAMPLE 6

This example illustrates how the mixture of composite particles can be used to obtain a visual effect that lasts for a longer period of time in powdered acidic soft drinks. Composite particles prepared according to Examples 1 and 5 were sieved to recover the −14 +30 fraction (U.S. Sieve Series sizes). About 0.25 g of the composite particles from Example 1 and 0.25 g of the composite particles from Example 5 were mixed with 13 g of powdered soft drink (KOOL-AID®). When (160 mL) water was added to this mixture, the composite particles of Example 1 first floated to the top, then sank to the bottom, then floated to the top, and so in a cyclic manner. The up and down motion of the particles continued for approximately 2.5 minutes. The composite particles of Example 5 started moving up and down after about 2 minutes and the up and down movement lasted for about 5 minutes. Thus, by combining the particles from Examples 1 and 5, it was possible to obtain particle movement for a longer period of time.

EXAMPLE 7

This example shows that the composite particles of the present invention can also be used for creating optical, fun effects in ready to drink beverages by providing these particles in a sachet which are to be added to the beverage at the time of consumption. Composite particles (0.5 g) having −14 +30 fraction (U.S. Sieve Series sizes) from Example 1 were added to a ready-to-drink beverage (Crystal Lite®). The up and down movement of the particles start almost immediately and lasted for about 2 minutes. This will be effective as long as there is an acid component in the beverage. An edible acid may be added to the sachet along with the composite particles in the case that the beverage does not contain an acid.

While the invention has been particularly described with specific reference to particular process and product embodiments, it will be appreciated that various alterations, modifications and adaptions may be based on the present disclosure, and are intended to be within the spirit and scope of the present invention as defined by the following claims.

What is claimed is:

1. Composite particles, comprising water-soluble core particles and a coating attached to outer surfaces of the core particles wherein the coating covers at least a majority of the outer surfaces of the core particles, and wherein the coating comprises a matrix material and a gas-forming substance that generates a gas when contacted with an edible acid, whereby the composite particles, when incorporated into a beverage with the edible acid, exhibit movement within the beverage due to the gas generated.

2. The composite particles of claim 1, wherein the gas-forming substance comprises a carbon dioxide-forming substance.

3. The composite particles of claim 2, wherein the carbon dioxide-forming substance comprises metal bicarbonate.

4. The composite particles of claim 3, wherein the metal bicarbonate is selected from sodium bicarbonate and potassium bicarbonate, and combinations thereof.

5. The composite particles of claim 1, wherein the matrix material comprises a food polymer which retains the gas-forming substance in the coating until contacted with the edible acid.

6. The composite particles of claim 5, wherein the food polymer is selected from gum arabic, gelatin, maltodextrin, xanthan gum, locust bean, guar, pectin, carrageenan, cellulose, and combinations thereof.

7. The composite particles of claim 1, wherein the core particles comprise a saccharide, an edible salt, or an edible acid.

8. The composite particles of claim 1, wherein the core particles comprise a monosaccharide, disaccharide, or polysaccharide, and combinations thereof.

9. The composite particles of claim 1, wherein the core particles comprise a disaccharide selected from sucrose, maltose, cellobiose, lactose, and combinations thereof.

10. The composite particles of claim 1, wherein the core particles comprise a monosaccharide selected from fructose, glucose, dextrose, mannose, galactose, ribose, xylose, arabinose, gulose, lyxose, and combinations thereof.

11. The composite particles of claim 1, wherein the core particles comprise a polysaccharide selected from starch, dextrin, cellulose, polydextrose, raffinose, and combinations thereof.

12. The composite particles of claim 1, wherein the composite particles have an average particle size of 0.3 to about 3.5 mm.

13. The composite particles of claim 1, wherein the core particles comprise a polysaccharide.

14. The composite particles of claim 1, wherein the coating covers essentially all of the outer surfaces of the core particles.

15. An optically-enhanced dry beverage mix comprising a dry beverage mixture and composite particles, wherein the composite particles comprise water-soluble core particles and a coating attached to outer surfaces of the core particles wherein the coating covers at least a majority of the outer surfaces of the core particles, wherein the coating comprises a matrix material and a gas-forming substance that generates a gas when contacted with an edible acid, whereby the composite particles, when the optically-enhanced dry beverage mix is mixed with water to form a beverage with the edible acid, exhibit movement within the beverage due to the gas generated.

16. The optically-enhanced dry beverage mix of claim 15, further comprising a water-soluble, dry edible acid.

17. The optically-enhanced dry beverage mix of claim 16, wherein the edible acid comprises an acid selected from citric acid, malic acid, fumaric acid, phosphoric acid, and combinations thereof.

18. The optically-enhanced dry beverage mix of claim 15, wherein the gas-forming substance comprises a carbon dioxide-forming substance.

19. The optically-enhanced dry beverage mix of claim 18, wherein the carbon dioxide-forming substance comprises metal bicarbonate.

20. The optically-enhanced dry beverage mix of claim 19, wherein the metal bicarbonate is selected from sodium bicarbonate and potassium bicarbonate, and combinations thereof.

21. The optically-enhanced dry beverage mix of claim 15, wherein the matrix material comprises a food polymer that holds the metal bicarbonate.

22. The optically-enhanced dry beverage mix of claim 15, wherein the food polymer is selected from gum arabic, gelatin, maltodextrin, xanthan gum, locust bean, guar, pectin, carrageenan, cellulose, and combinations thereof.

23. The optically-enhanced dry beverage mix of claim 15, wherein the core particles comprise a saccharide, an edible salt, or an edible acid.

24. The optically-enhanced dry beverage mix of claim 15, wherein the core particles comprise a monosaccharide, disaccharide, or polysaccharide, and combinations thereof.

25. The optically-enhanced dry beverage mix of claim 15, wherein the core particles comprise a disaccharide selected from sucrose, maltose, cellobiose, lactose, and combinations thereof.

26. The optically-enhanced dry beverage mix of claim 15, wherein the core particles comprise a monosaccharide selected from fructose, glucose, dextrose, mannose, galactose, ribose, xylose, arabinose, gulose, lyxose, and combinations thereof.

27. The optically-enhanced dry beverage mix of claim 15, wherein the core particles comprise a polysaccharide selected from starch, dextrin, cellulose, polydextrose, raffinose, and combinations thereof.

28. The optically-enhanced dry beverage mix of claim 15, wherein the composite particles have an average particle size of 0.3 to about 3.5 mm.

29. The optically-enhanced dry beverage mix of claim 15, wherein the composite particles move within the beverage for at least about 90 seconds after the optically-enhanced dry beverage mix is mixed with water to form the beverage.

30. The optically-enhanced dry beverage mix of claim 15, wherein the composite particles move within the beverage for at least about two minutes after the optically-enhanced dry beverage mix is mixed with water to form the beverage.

31. The optically-enhanced dry beverage mix of claim 15, wherein the composite particles move within the beverage at an initial speed of at least about 5 cm/sec after the optically-enhanced dry beverage mix is mixed with water to form the beverage.

32. The optically-enhanced dry beverage mix of claim 15, further comprising a flavoring agent or a coloring agent.

33. The optically-enhanced dry beverage mix of claim 15, further comprising a nutritional supplement selected from a vitamin, mineral, and combinations thereof.

34. A method for making composite particles, said method comprising preparing an coating composition comprising a fluid dispersion of a carbon dioxide-forming substance and a matrix material; spray coating water-soluble core particles with the coating composition to form the composite particles; and drying the composite particles, whereby the composite particles, when mixed with water to form a beverage containing an edible acid, exhibit movement within the beverage due to carbon dioxide generated by the reaction of the carbon dioxide-forming substance with the edible acid.

35. The method of claim 34, wherein the water-soluble core particles are spray coated with the coating composition in a fluidized bed.

36. The method of claim 34, wherein the core particles comprise carbohydrate particles, edible salt particles, or edible acid particles; the carbon dioxide-forming substance comprises a bicarbonate; and, the matrix material comprises a food polymer.

37. The method of claim 36, wherein the composite particles have an average particle size of 0.3 to about 3.5 mm.

* * * * *

UNITED STATES PATENT AND TRADEMARK OFFICE
CERTIFICATE OF CORRECTION

| | | |
|---|---|---|
| PATENT NO. | : 7,094,434 B2 | Page 1 of 1 |
| APPLICATION NO. | : 10/702804 | |
| DATED | : August 22, 2006 | |
| INVENTOR(S) | : Gaonkar et al. | |

It is certified that error appears in the above-identified patent and that said Letters Patent is hereby corrected as shown below:

-On Title Page (56), col. 2, under (U.S. Patent Documents), line 13, after "6,365,209", delete "B1" and insert -- B2 -- .

-In col. 16, line 30, claim 34, delete "an" and insert -- a -- .

-In col. 16, line 46, claim 36, delete "and," and insert -- and -- .

Signed and Sealed this

Twelfth Day of December, 2006

JON W. DUDAS
*Director of the United States Patent and Trademark Office*